(12) United States Patent
Havens et al.

(10) Patent No.: US 9,721,164 B2
(45) Date of Patent: *Aug. 1, 2017

(54) APPARATUS, SYSTEM, AND METHOD OF USE OF IMAGING ASSEMBLY ON MOBILE TERMINAL

(71) Applicant: Hand Held Products, Inc., Fort Mill, SC (US)

(72) Inventors: William H. Havens, Syracuse, NY (US); Ynjiun Paul Wang, Cupertino, CA (US); Jonathan Stiles, Marlton, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,915

(22) Filed: Feb. 25, 2016

(65) Prior Publication Data

US 2016/0171307 A1    Jun. 16, 2016

Related U.S. Application Data

(60) Continuation of application No. 13/975,845, filed on Aug. 26, 2013, now Pat. No. 9,277,109, which is a
(Continued)

(51) Int. Cl.
*H04N 5/232* (2006.01)
*G06K 9/00* (2006.01)
(Continued)

(52) U.S. Cl.
CPC .......... *G06K 9/00711* (2013.01); *G06K 9/228* (2013.01); *G06K 19/06028* (2013.01);
(Continued)

(58) Field of Classification Search
CPC ......... H02P 8/22; H04M 1/21; H04M 1/0262; H04M 1/0216; H04N 5/23245; H04N 5/2355; H04N 5/23222; G01N 33/497
(Continued)

(56) References Cited

U.S. PATENT DOCUMENTS 6,636,158 B1    10/2003    Bando et al.
6,722,569 B2    4/2004    Ehrhart et al.
(Continued)

FOREIGN PATENT DOCUMENTS

CN    101682681 A    3/2010
WO    2010093423 A2    8/2010
WO    2010146558 A1    12/2010

OTHER PUBLICATIONS

Search Report and Annex in European Application No. 12153189.1, dated Sep. 27, 2013, 3 pages. Previously submitted in Parent Application.
(Continued)

*Primary Examiner* — Phuoc H Doan
(74) *Attorney, Agent, or Firm* — Addition, Higgins & Pendleton, P.A.

(57) ABSTRACT

A system for collecting data comprising a mobile terminal for capturing a plurality of frames of image data, the mobile terminal having a first imaging assembly and a second imaging assembly, the first imaging assembly for capturing a first frame of image data representing a first object and the second imaging assembly for capturing a second frame of image data representing a second object, wherein the system for use in collecting data is operative for associating first frame information and second frame information, the first frame information including one or more of image data of the first frame of image data and information derived utilizing the image data of the first frame of image data, the second frame information including one or more of image
(Continued)

data of the second frame of image data and information derived utilizing the image data of the second frame of image data.

20 Claims, 9 Drawing Sheets

Related U.S. Application Data division of application No. 13/018,138, filed on Jan. 31, 2011, now Pat. No. 8,520,080.

(51) Int. Cl.
  *H04N 5/225* (2006.01)
  *G06K 9/22* (2006.01)
  *G06K 19/06* (2006.01)
  *G06Q 50/28* (2012.01)
  *H04N 5/247* (2006.01)
  *H04N 1/00* (2006.01)
  *H04N 7/14* (2006.01)

(52) U.S. Cl.
  CPC ......... *G06Q 50/28* (2013.01); *H04N 5/2252* (2013.01); *H04N 5/2258* (2013.01); *H04N 5/23229* (2013.01); *H04N 5/23238* (2013.01); *H04N 5/247* (2013.01); *H04N 1/00307* (2013.01); *H04N 2007/145* (2013.01)

(58) Field of Classification Search
  USPC .............. 455/575.4, 556.1; 235/440; 396/85; 348/344
  See application file for complete search history.

(56) References Cited

U.S. PATENT DOCUMENTS

| | | |
|---|---|---|
| 6,775,397 B1 | 8/2004 | Hamalainen |
| 6,834,807 B2 | 12/2004 | Ehrhart et al. |
| 6,871,004 B1 | 3/2005 | Bando |
| 6,942,151 B2 | 9/2005 | Ehrhart |
| 6,968,116 B2 | 11/2005 | Bando |
| 6,972,757 B2 | 12/2005 | Arikawa et al. |
| 6,983,100 B2 | 1/2006 | Bando |
| 7,086,596 B2 | 8/2006 | Meier et al. |
| 7,111,787 B2 | 9/2006 | Ehrhart |
| 7,142,231 B2 | 11/2006 | Chipchase et al. |
| 7,162,030 B2 | 1/2007 | Bell et al. |
| 7,219,843 B2 | 5/2007 | Havens et al. |
| 7,239,805 B2 | 7/2007 | Uyttendaele et al. |
| 7,253,843 B2 | 8/2007 | Lee |
| 7,287,697 B2 | 10/2007 | Ehrhart et al. |
| 7,301,555 B2 | 11/2007 | Navntoft |
| 7,331,523 B2 | 2/2008 | Meier et al. |
| 7,370,121 B2 | 5/2008 | Khandelwal et al. |
| 7,405,751 B2 | 7/2008 | Lee |
| 7,411,623 B2 | 8/2008 | Shibutani |
| 7,413,127 B2 | 8/2008 | Ehrhart et al. |
| 7,424,218 B2 | 9/2008 | Baudisch et al. |
| 7,451,917 B2 | 11/2008 | McCall et al. |
| 7,537,165 B2 | 5/2009 | Knowles et al. |
| 7,540,422 B2 | 6/2009 | Knowles et al. |
| 7,540,424 B2 | 6/2009 | Knowles et al. |
| 7,543,747 B2 | 6/2009 | Ehrhart |
| 7,543,749 B2 | 6/2009 | Knowles et al. |
| 7,556,199 B2 | 7/2009 | Knowles et al. |
| 7,559,474 B2 | 7/2009 | Knowles et al. |
| 7,565,059 B2 | 7/2009 | Neuman |
| 7,568,015 B2 | 7/2009 | Wang et al. |
| 7,568,626 B2 | 8/2009 | Knowles et al. |
| 7,571,859 B2 | 8/2009 | Knowles et al. |
| 7,575,169 B2 | 8/2009 | Knowles et al. |
| 7,580,952 B2 | 8/2009 | Logan et al. |
| 7,581,680 B2 | 9/2009 | Knowles et al. |
| 7,584,892 B2 | 9/2009 | Knowles et al. |
| 7,586,655 B1 | 9/2009 | Uhlik et al. |
| 7,594,045 B2 | 9/2009 | Lee |
| 7,594,608 B2 | 9/2009 | Knowles et al. |
| 7,605,844 B1 | 10/2009 | Page |
| 7,611,062 B2 | 11/2009 | Knowles et al. |
| 7,619,784 B1 | 11/2009 | O'Sullivan et al. |
| 7,624,497 B2 | 12/2009 | Kim |
| 7,627,240 B2 | 12/2009 | Nikkanen |
| 7,636,794 B2 | 12/2009 | Ramos et al. |
| 7,673,802 B2 | 3/2010 | Knowles et al. |
| 7,677,817 B2 | 3/2010 | Vapaakoski |
| 7,686,222 B2 | 3/2010 | Ehrhart et al. |
| 7,690,572 B2 | 4/2010 | Meier et al. |
| 7,748,620 B2 | 7/2010 | Gomez et al. |
| 7,764,320 B1 | 7/2010 | Salvato |
| 7,770,799 B2 | 8/2010 | Wang |
| 7,784,698 B2 | 8/2010 | Knowles et al. |
| 7,787,659 B2 | 8/2010 | Schultz et al. |
| 7,804,528 B2 | 9/2010 | Bando |
| 7,843,436 B2 | 11/2010 | Jo |
| 7,905,413 B2 | 3/2011 | Knowles et al. |
| 7,925,288 B2 | 4/2011 | Kim |
| 8,035,689 B2 | 10/2011 | Alakarhu |
| 8,203,605 B1 | 6/2012 | Starner et al. |
| 8,217,983 B2 | 7/2012 | Chun et al. |
| 8,520,080 B2 | 8/2013 | Havens et al. |
| 8,599,271 B2 | 12/2013 | Havens et al. |
| 9,277,109 B2 | 3/2016 | Havens et al. |
| 2003/0222147 A1 | 12/2003 | Havens et al. |
| 2004/0135902 A1 | 7/2004 | Steensma |
| 2004/0186877 A1 | 9/2004 | Wang et al. |
| 2004/0212709 A1 | 10/2004 | Lee et al. |
| 2005/0036044 A1 | 2/2005 | Funakura |
| 2005/0036046 A1 | 2/2005 | Atsum |
| 2005/0075932 A1 | 4/2005 | Mankoff |
| 2005/0152674 A1 | 7/2005 | Bando |
| 2005/0158025 A1* | 7/2005 | Shinkai ............... H04N 9/8205 386/240 |
| 2005/0200718 A1 | 9/2005 | Lee |
| 2005/0268003 A1 | 12/2005 | Wang et al. |
| 2006/0017832 A1 | 1/2006 | Kemppinen |
| 2006/0089792 A1 | 4/2006 | Manber et al. |
| 2006/0114531 A1 | 6/2006 | Webb et al. |
| 2006/0120588 A1 | 6/2006 | Kwon et al. |
| 2006/0120712 A1 | 6/2006 | Kim et al. |
| 2006/0139463 A1 | 6/2006 | Heinonen |
| 2006/0140450 A1 | 6/2006 | Hong et al. |
| 2006/0216022 A1 | 9/2006 | Lee et al. |
| 2006/0222079 A1 | 10/2006 | Park |
| 2006/0268987 A1 | 11/2006 | Ha |
| 2007/0250853 A1 | 10/2007 | Jain et al. |
| 2007/0265028 A1 | 11/2007 | Jorgensen |
| 2007/0285550 A1 | 12/2007 | Son |
| 2008/0030587 A1 | 2/2008 | Helbing |
| 2008/0030589 A1 | 2/2008 | Shin et al. |
| 2008/0079841 A1 | 4/2008 | Cieslinksi |
| 2008/0084482 A1* | 4/2008 | Hansson ............ H04N 5/23232 348/218.1 |
| 2008/0089412 A1 | 4/2008 | Ugur et al. |
| 2008/0123938 A1 | 5/2008 | Kim |
| 2008/0159638 A1 | 7/2008 | Song et al. |
| 2008/0168807 A1 | 7/2008 | Dion et al. |
| 2008/0170806 A1 | 7/2008 | Kim |
| 2008/0192147 A1 | 8/2008 | Choi |
| 2008/0205511 A1 | 8/2008 | Hannuksela |
| 2008/0240590 A1 | 10/2008 | Moon et al. |
| 2008/0278608 A1 | 11/2008 | Kim et al. |
| 2008/0296370 A1 | 12/2008 | Khandelwal et al. |
| 2008/0310686 A1 | 12/2008 | Kretz |
| 2008/0310762 A1 | 12/2008 | Lee et al. |
| 2008/0316329 A1 | 12/2008 | Kim et al. |
| 2009/0027709 A1 | 1/2009 | You |
| 2009/0066783 A1 | 3/2009 | Lee et al. |
| 2009/0083275 A1 | 3/2009 | Jacob et al. |
| 2009/0109276 A1 | 4/2009 | Kim |
| 2009/0202176 A1 | 8/2009 | Hwang et al. |
| 2009/0208119 A1 | 8/2009 | Lee et al. |
| 2009/0219282 A1 | 9/2009 | Kim et al. |

(56) References Cited

U.S. PATENT DOCUMENTS

| | | |
|---|---|---|
| 2009/0226080 A1 | 9/2009 | Boyd et al. |
| 2009/0263100 A1 | 10/2009 | Neuman |
| 2009/0287620 A1 | 11/2009 | Xu |
| 2009/0297052 A1 | 12/2009 | Xu et al. |
| 2009/0307261 A1 | 12/2009 | Lindley |
| 2010/0039530 A1 | 2/2010 | Guo et al. |
| 2010/0134651 A1 | 6/2010 | Morimoto |
| 2010/0141803 A1 | 6/2010 | Jung et al. |
| 2010/0176201 A1 | 7/2010 | Ehrhart et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188407 A1 | 7/2010 | Nielsen et al. |
| 2010/0189312 A1 | 7/2010 | Nielsen et al. |
| 2010/0198663 A1 | 8/2010 | Nielsen et al. |
| 2011/0001838 A1 | 1/2011 | Lee |
| 2011/0004613 A1 | 1/2011 | Arrasvuori et al. |
| 2011/0031314 A1 | 2/2011 | Barber et al. |
| 2011/0058022 A1 | 3/2011 | Choi |
| 2011/0074931 A1 | 3/2011 | Bilbrey et al. |
| 2011/0085015 A1 | 4/2011 | Jun et al. |
| 2011/0090351 A1 | 4/2011 | Cote et al. |
| 2011/0090381 A1 | 4/2011 | Cote et al. |
| 2011/0164105 A1 | 7/2011 | Lee et al. |
| 2011/0187811 A1 | 8/2011 | Kim et al. |
| 2011/0193933 A1 | 8/2011 | Ryu et al. |
| 2011/0242271 A1 | 10/2011 | Ogale et al. |
| 2011/0261167 A1 | 10/2011 | Shin |
| 2011/0298898 A1 | 12/2011 | Jung et al. |
| 2011/0298940 A1 | 12/2011 | Cheong et al. |
| 2011/0304708 A1 | 12/2011 | Ignatov |
| 2012/0002958 A1 | 1/2012 | Muukki |
| 2012/0019617 A1 | 1/2012 | Ahn et al. |
| 2012/0044372 A1 | 2/2012 | Cote et al. |
| 2012/0044401 A1 | 2/2012 | Parviainen |
| 2012/0045093 A1 | 2/2012 | Salminen |
| 2012/0050567 A1 | 3/2012 | Cote et al. |
| 2012/0051713 A1 | 3/2012 | Myung |
| 2012/0057039 A1 | 3/2012 | Gardiner et al. |
| 2012/0062707 A1 | 3/2012 | Seo et al. |
| 2012/0081392 A1 | 4/2012 | Arthur |
| 2012/0081577 A1 | 4/2012 | Cote et al. |
| 2012/0092529 A1 | 4/2012 | Choi et al. |
| 2012/0100888 A1 | 4/2012 | Kim et al. |
| 2012/0106919 A1 | 5/2012 | Song et al. |
| 2012/0113231 A1 | 5/2012 | Kim et al. |
| 2012/0121178 A1 | 5/2012 | Finlayson |
| 2012/0163606 A1 | 6/2012 | Eronen et al. |
| 2012/0169638 A1 | 7/2012 | Kim et al. |
| 2012/0169848 A1 | 7/2012 | Bae et al. |
| 2012/0176401 A1 | 7/2012 | Hayward et al. |
| 2012/0188402 A1 | 7/2012 | Guo et al. |
| 2012/0196648 A1 | 8/2012 | Havens et al. |
| 2012/0196649 A1 | 8/2012 | Havens et al. |

OTHER PUBLICATIONS

Office Action in U.S. Appl. No. 13/429,980, dated Jun. 18, 2012. Previously submitted in Parent Application.

Claims 1-10 in U.S. Appl. No. 13/429,980. as submitted Aug. 1, 2012, 2 pgs Previously submitted in Parent Application.

Amendment and Terminal Disclaimer in response to Office Action dated Oct. 1, 2012 for U.S. Appl. No. 13/429,980. Response and Terminal Disclaimer filed Jan. 2, 2013, 6 pages. Previously submitted in Parent Application.

Apr. 1, 2013 Communication filed in U.S. Appl. No. 13/429,980. Previously submitted in Parent Application.

Office Action in counterpart Chinese Application No. 201210084110.1 dated Oct. 17, 2016, pp. 1-6.

English-translation of Office Action in counterpart Chinese Application No. 201210084110.1 dated Oct. 17, 2016, pp. 1-8.

* cited by examiner

APPARATUS, SYSTEM, AND METHOD OF USE OF IMAGING ASSEMBLY ON MOBILE TERMINAL

CROSS REFERENCE TO RELATED APPLICATIONS

The present application claims the benefit of U.S. patent application Ser. No. 13/975,845 for an Apparatus, System, and Method of Use of Imaging Assembly on Mobile Terminal filed Aug. 26, 2013 (and published Dec. 26, 2013 as U.S. Patent Publication No. 2013/0342717), now U.S. Pat. No. 9,277,109, which claims the benefit of U.S. patent application Ser. No. 13/018,138 for an Apparatus, System, and Method of Use of Imaging Assembly on Mobile Terminal filed Jan. 31, 2011 (and published Aug. 2, 2012 as U.S. Patent Publication No. 2012/0196648), now U.S. Pat. No. 8,520,080. Each of the foregoing patent applications, patent publications, and patents is hereby incorporated by reference in its entirety.

U.S. patent application Ser. No. 13/429,980 for an Apparatus, System, and Method of Use of Imaging Assembly on Mobile Terminal filed Mar. 26, 2012 (and published Aug. 2, 2012 as U.S. Patent Publication No. 2012/0196649), now U.S. Pat. No. 8,599,271 also claims the benefit of U.S. patent application Ser. No. 13/018,138. Each of the foregoing patent applications, patent publication, and patent is hereby incorporated by reference in its entirety.

FIELD OF THE INVENTION

The present invention relates generally to a data collection system, and, more specifically, to imaging devices on a mobile terminal.

BACKGROUND

A mobile terminal is used for sending and receiving information in a communication system, such as a mobile telephone in a cellular telephone system. A mobile terminal can communicate with one or more external server. The one or more external server can include one or more local server and one or more remote server.

A mobile terminal can include a display and input devices, such as keypads, buttons, and the like, which are used to control the mobile terminal. The display is used for viewing information and the input mechanisms typically provide for data entry, as well as control of any multi-media interface including the display. In some mobile terminals a display is provided with an associated touch panel to form a touch screen display. A mobile terminal having a display can display virtual input actuators, often referred to as virtual buttons. A mobile terminal can also include an imaging device for taking an image. One example of a mobile terminal is a mobile terminal which is equipped with one or more radio transceivers for providing communication with a cellular network. Another example of a mobile terminal is known as the a portable data terminal which can be primarily used in data collection application including shipping and warehouse applications, as well as retail store applications and health care facility data management applications.

Mobile terminals are also available in a form devoid of a display. For example a gun style bar code reader is commonly provided in a form devoid of a display. Gun style bar code readers are commonly used in retail stores, and shipping warehouses.

SUMMARY

A system for collecting data including a mobile terminal for capturing a plurality of frames of image data, the mobile terminal having a first imaging assembly, a second imaging assembly, a display, and a hand held housing on which the display is disposed and which houses one or more components of the first imaging assembly and one or more components of the second imaging assembly, wherein the first imaging assembly includes a first image sensor array and a first imaging lens focusing an image onto the first image sensor array of the first imaging assembly, the first image sensor array having a plurality of pixels, the first imaging assembly for use in capturing a first frame of image data representing a first image, wherein the second imaging assembly comprises a second image sensor array and a second imaging lens focusing an image onto the second image sensor array of the second imaging assembly, the second image sensor array having a plurality of pixels, the second imaging assembly for use in capturing a second frame of image data representing a second object. Furthermore, the system for use in collecting data can be operative for associating first frame information and second frame information, the first frame information including one or more of image data of the first frame of image data and information derived utilizing the image data of the first frame of image data, the second frame information including one or more of image data of the second frame of image data and information derived utilizing the image data of the second frame of image data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
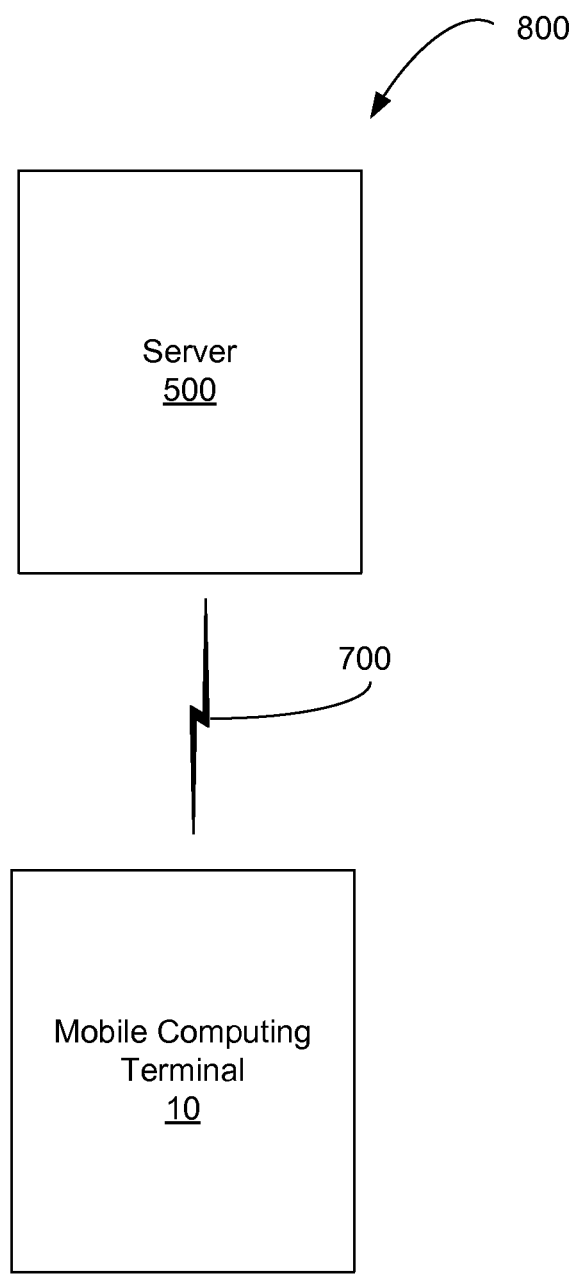
FIG. 1 is a system diagram illustrating a system for collecting data according to some embodiments of the present invention.

FIG. 1 is a system diagram illustrating a system 800 for collecting data according to some embodiments of the present invention. A mobile terminal 10 can be connected to a server 500 via communication link 700. The server 500 can be located in a local environment (e.g., the same building, etc.) relative to the mobile terminal 10, or a remote environment. Data can be exchanged between the mobile terminal 10 and server 500 over the communication link 700. System 800 can be in network communication with one another via appropriate communication protocols, e.g., TCP/IP communication protocols, UDP/IP communication protocols, or other suitable network communication protocols. In some embodiments, terminal 10 and server 500 can be disposed in a common local facility. In some embodiments, terminal 10 can be disposed in a common local facility and server 500 can be disposed remote from the local facility. In some embodiments, terminal 10 can be transported between a plurality of local destinations as in a shipping application, and server 500 can be disposed remote from each of the local destinations. In some embodiments, where recited functionality is performed by terminal 10 without use of server 500, system 800 can be regarded as including terminal 10 without including server 500.

Figure 2:
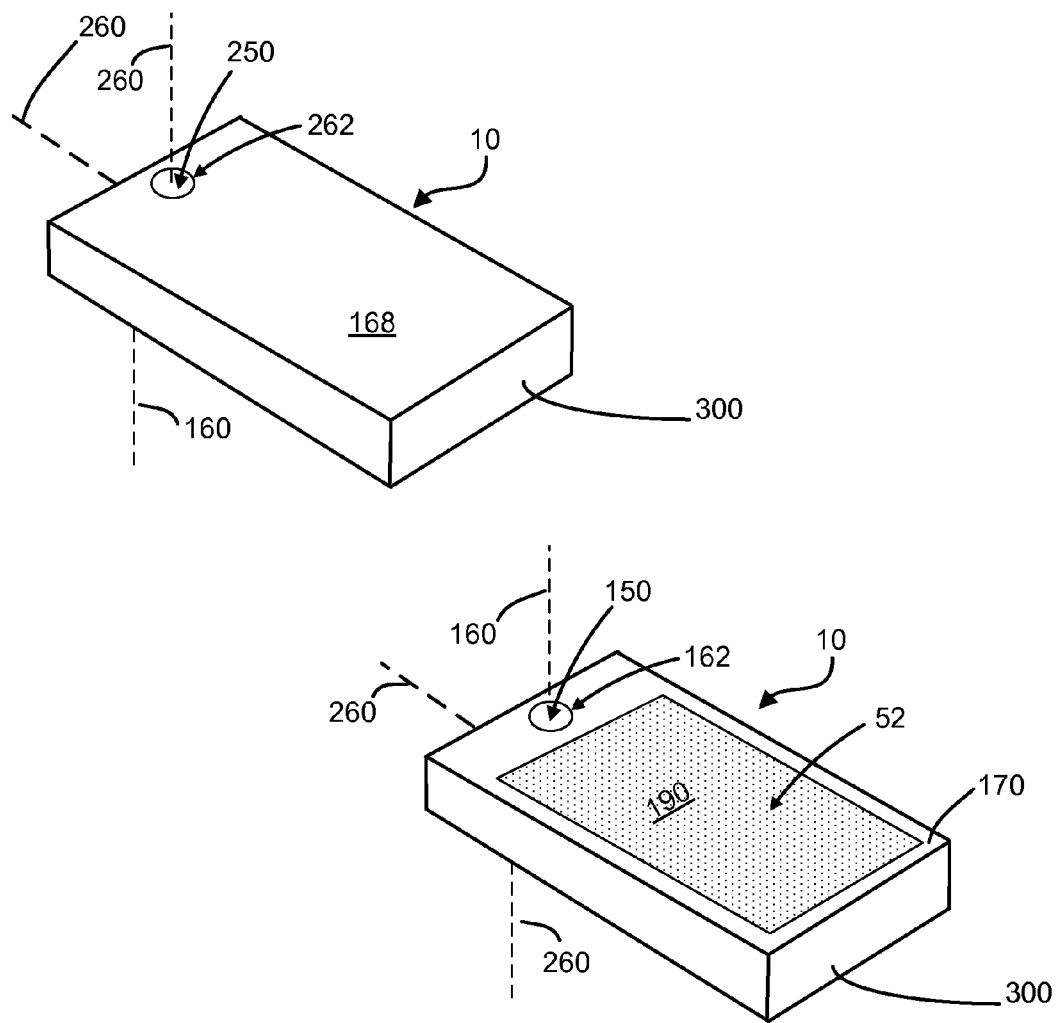
FIG. 2 is a diagram of a mobile terminal according to some embodiments of the present invention.

FIG. 2 is a diagram of a mobile terminal 10 according to some embodiments of the present invention. Mobile terminal 10 includes a first imaging window 162 and second imaging window 262. The mobile terminal includes a hand held housing 300 on which a display 52 is disposed. Display 52 can extend in a display plane 190, hand held housing 300 also houses and has disposed therein one or more components of the first imaging assembly 150 and the second imaging assembly 250.

The first imaging assembly 150 can be positioned behind the first imaging window 162 such that the first imaging assembly 150 can be utilized for capture of a frame of image data representing an object. The first imaging assembly 150 can have a first imaging axis 160. The first imaging assembly 150 ideally can be utilized for capture of a frame of image data representing an object, where the object is located along first imaging axis 160, or within a field view of first imaging assembly 150 centered around first imaging axis 160.

Similarly, the second imaging assembly 250 can be located behind the second imaging window 262 and can have a second imaging axis 260. The second imaging assembly 250 can be utilized for capture of a frame of image data representing an object, where the object is located along second imaging axis 260 or within a field view centered around second imaging axis 260.

The first imaging window 162 can be located on a first side 170 of the mobile terminal 10, and the second imaging window 262 can be located on a second side 168 of the mobile terminal 10 that is opposite first side 170. Accordingly, the first imaging window 162 and second imaging window 262 are oriented on opposite sides 168, 170 and face opposite directions. First imaging assembly 150 in the embodiment of FIG. 2 has a first imaging axis 160 extending upwardly from terminal 10 and second imaging assembly 250 has a second imaging axis 260 extending downwardly from terminal 10. Directions of imaging axes 160, 260 set forth herein are directions extending from an image sensing source, e.g., as image sensor array to a target defined by a field of view of the imaging assembly associated to an image sensing source.

In a further aspect of the embodiment of FIG. 2, the display 52 extends in a display plane 190 as illustrated. The first imaging axis 160 extends from the mobile terminal 10 upwardly from the display plane 190 while the second imaging axis 260 extends from the mobile terminal 10 downwardly from the display plane 190. Accordingly, a user may operate the mobile terminal 10 to capture a first frame representing a first object located on a first side of the display plane 190, and to capture a second frame representing a second object that is located on an opposite side of the display plane 190. In some embodiments, the first imaging axis 160 and second imaging axis 260 are orthogonal to display plane 190. In some embodiments, the first imaging axis 160 and second imaging axis 260 form a collinear path with first imaging axis 160 of first imaging assembly 150 extending upwardly from terminal 10 and second imaging axis 260 of second imaging assembly 250 extending downwardly from terminal 10. While imaging axis 260 is depicted as extending downwardly from terminal 10 in the embodiment of FIG. 2, terminal 10 can also be configured so that imaging axis 260 extends forwardly from terminal 10 as is depicted by imaging axis 260 shown with relatively longer dashes. "Forwardly" herein is inclusive of directions that are upwardly forwardly or downwardly forwardly. Similarly "upwardly" is inclusive of directions that are rearwardly upwardly or forwardly upwardly, "downwardly" is inclusive of directions that are rearwardly downwardly or forwardly downwardly, and "rearwardly" is inclusive of directions that are upwardly rearwardly or downwardly rearwardly.

In another aspect, system 800 can be operative to associate first frame information and second frame information. The first frame information can be image data of the first frame or data derived utilizing the first frame of image data. The second frame information can be image data of the second frame of data or data derived utilizing the second frame of image data. In some embodiments, associating includes providing a file that includes information relating to both frames i.e., first frame information and second frame information. In some embodiments, the mobile terminal 10 is configured to associate first frame information and second frame information. In such embodiments, mobile terminal 10 can be configured to process one or more of the first and second frames prior to performing association. In some embodiments, the mobile terminal 10 transmits the first frame and the second frame to server 500 via communication link 700, and server 500 is configured to the associate of the first frame information and the second frame information. Prior to associating, system 800 can process one or more of the first frame and the second frame. Such processing can be performed by one or more of terminal 10 and server 500.

As illustrated in FIG. 2, the first imaging axis 160 and second imaging axis 260 can be parallel and spaced apart from each other. By having the first imaging axis 160 and second imaging axis 260 parallel and displaced from each other and extending in opposite directions from their associated image sensor array, a user can easily aim the first imaging axis 160 and second imaging axis 260 to accurately capture first and second frames respectively first and second objects where the objects are located on opposite sides of a display plane. In some embodiments, one or more of the first imaging assembly 150 and second imaging assembly 250 includes an image sensor array provided by an infrared camera that can be used when the ambient lighting is at a sufficiently low level.

Figure 3:
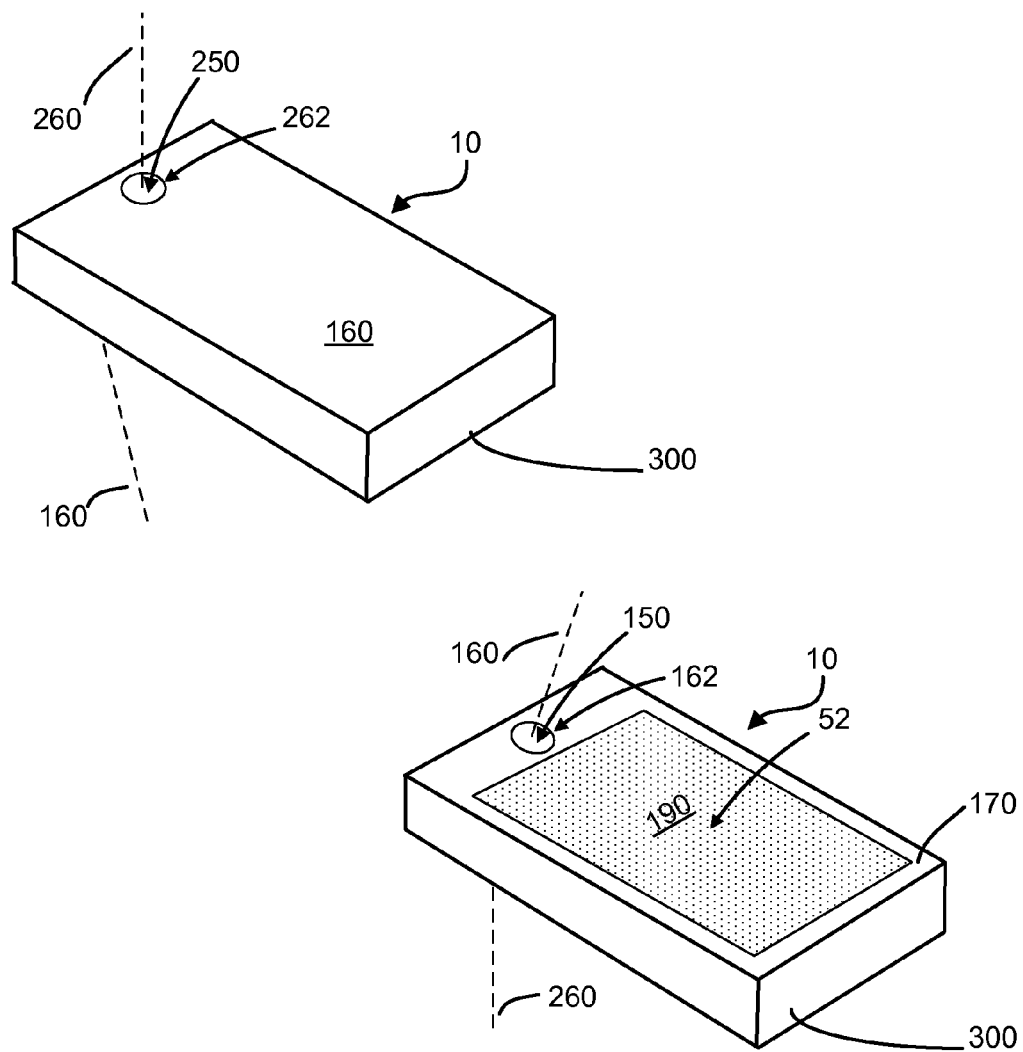
FIG. 3 is a diagram of a mobile terminal according to some embodiments of the present invention.

FIG. 3 is a diagram of a mobile terminal 10 according to another embodiment. In some embodiments, the first imaging axis 160 and second imaging axis 260 extend in directions that are non-parallel relative to one another so that the first imaging assembly 150 can have a field of view centered about axis 160 encompassing a first object that is oriented at a first angle relative to the display plane 190, while the second imaging assembly 250 can have a field of view centered about axis 260 encompassing a second object that is oriented at a second angle relative to the display plane 190 that is different from the first angle. In some embodiments, by having the first imaging axis 160 and second imaging axis 260 extend in directions that are non-parallel relative to one another, a user may utilize terminal 10 for capture of a first frame of image data representing a first object within a field of view of first imaging assembly 150, and a second frame of image data representing a second object within a field of view of second imaging assembly 250.

Figure 4:
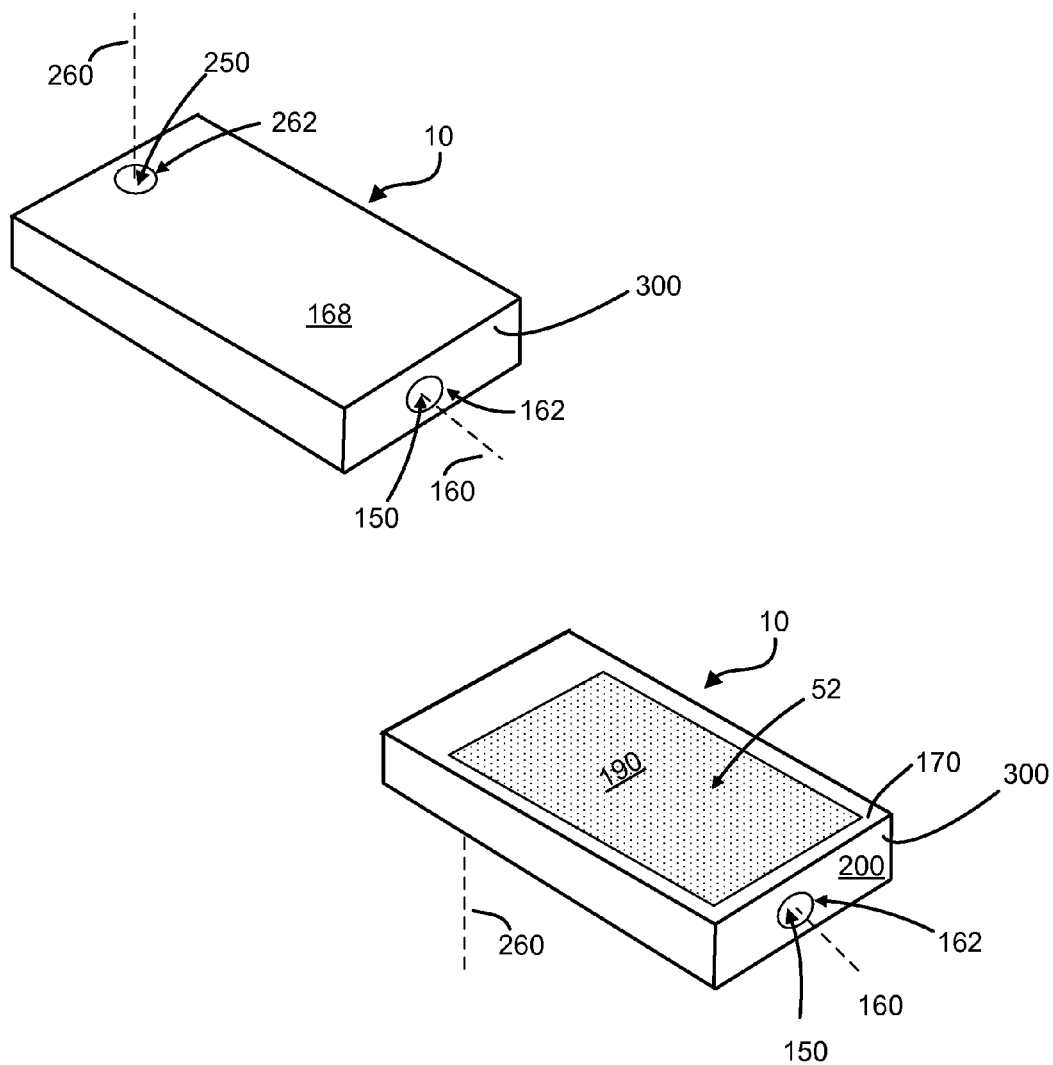
FIG. 4 is a diagram of a mobile terminal according to some embodiments of the present invention.

FIG. 4 is a diagram of a mobile terminal 10 according to another embodiment. The first imaging window 162 is located on a side 200 of the mobile terminal 10 that is substantially orthogonal to the display plane 190. Accordingly, the first imaging axis 160 is substantially parallel to the display plane 190, while the second imaging axis 260 is not parallel to the display plane 190. The first imaging axis 160 and second imaging axis 260 also extend in directions that are non-parallel relative to one another. While imaging axis 160 of FIG. 4 is depicted as extending rearwardly from terminal 10, terminal 10 otherwise configured as shown in FIG. 4 can be configured so that imaging axis 160 extends forwardly from terminal 10.

While the first imaging axis 160 and second imaging axis 260 have been illustrated as extending in specific directions, angles and alignments above, the first imaging axis 160 and second imaging axis 260 can be aligned in any direction suitable for capturing a frame of a first image and a frame of a second image with use of the respective imaging assemblies 150, 250. In the embodiment of FIGS. 2-4, imaging assemblies 150, 250 can be fixedly disposed in housing 300 so that imaging axes 160, 260 fixedly extend in a fixed direction from terminal 10. In another embodiment, terminal 10 can be configured so that an angle at which one or more of imaging axis 160 or imaging axis 260 extends from terminal 10 can be changed, e.g., by manual adjustment initiated by an operator.

Figure 5:
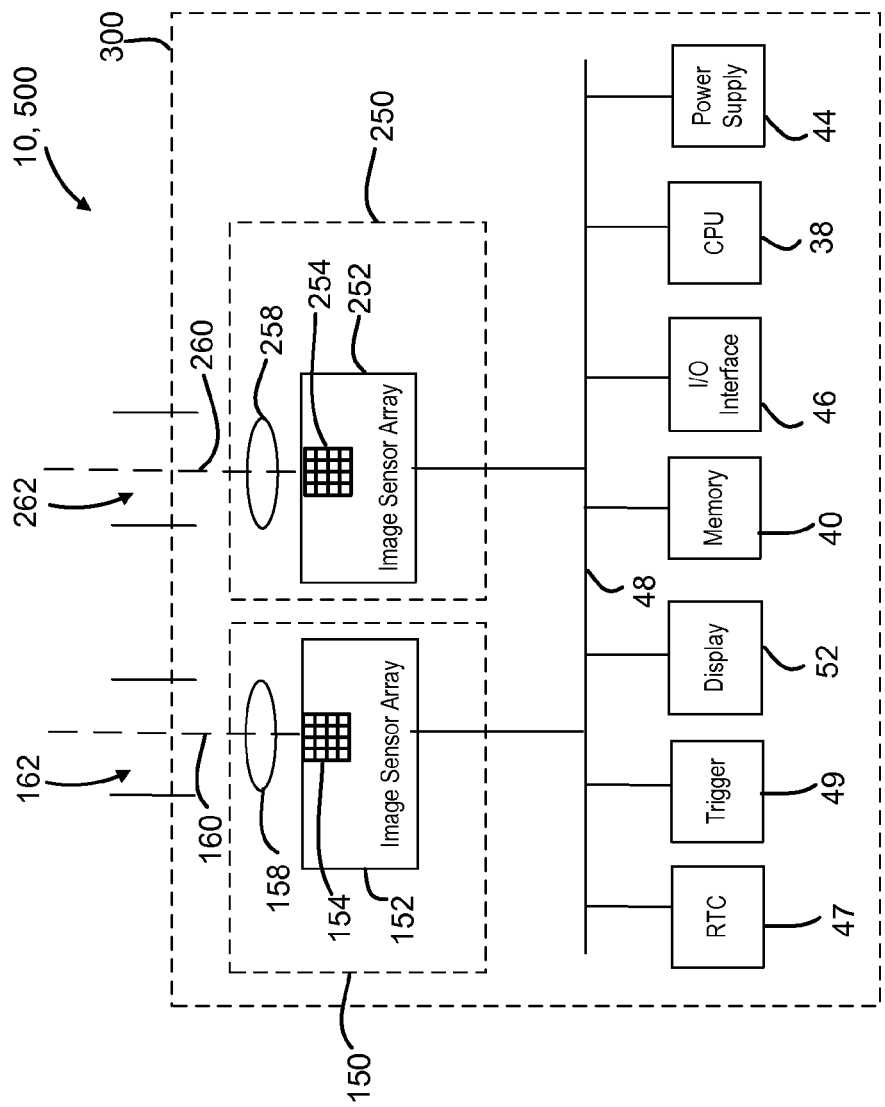
FIG. 5 is a block diagram illustrating a mobile terminal according to some embodiments of the present invention.

FIG. 5 is a block diagram illustrating a mobile terminal 10 according to some embodiments of the present invention. Mobile terminal 10 can include a power supply 44, memory 40, communication I/O interface 46, central processing unit (CPU) 38, a first imaging assembly 150 and a second imaging assembly 250 communicatively coupled together via system bus 48. As illustrated, first imaging assembly 150 can be positioned behind first imaging window 162, and second imaging assembly 250 can be positioned behind second imaging window 262. Terminal 10 can also have a trigger 49 for initiating frame capture and display 52. Display 52 can have an associated touch panel so that display 52 operates as a touch screen. In another aspect, terminal 10 can include real time clock (RTC) 47 coupled to system bus 48. Elements shown as being coupled to system bus 48 can be in communication with CPU 38. Dashed border 300 of FIG. 5 indicates components that can be disposed within hand held housing 300 in some embodiments. In another aspect, mobile terminal 10 can include appropriate telephony hardware and software for enabling telephonic communication between terminal 10 and server 500 which in one embodiment can be provided by a mobile terminal configured as a cellular mobile telephone.

First imaging assembly 150 can include an image sensor array 152 that can be a CMOS image sensor having an M×N array of pixels 154, having a plurality of rows and columns of pixels. In some embodiments, the CPU 38 can be operative to communicate with memory 40 and store data in memory 40. First imaging assembly 150 can be operative to capture frames of image data by readout, conversion, and storage of frame of image data into memory 40. Prior to readout of a frame, a frame can be exposed during an exposure period of first imaging assembly 150. In some embodiments, the CPU 38 may be further operative to communicate with, and transmit information, to the communication I/O interface 46. Image sensor array 152, in some embodiments can be an infrared image sensor that is selectively sensitive to light in the infrared wavelength band.

Referring to further aspects of first imaging assembly 150, an imaging lens assembly 158 can be adapted for focusing an image onto image sensor array 152. Lens assembly 158 and image sensor array 152 define a field of view of imaging assembly 150, as well as first imaging axis 160. Imaging light rays can be transmitted about first imaging axis 160. Imaging lens assembly 158 can be adapted to be capable of multiple focal lengths and multiple best focus distances. Imaging lens assembly 158 may include a focusing apparatus (e.g., a lens element, a fluid lens element or a pump in combination with a lens element, etc.) employed alone or in combination with other optical elements (e.g., a deformable fluid lens element, an electrowetting fluid lens element, or a traditional non-deformable solid (e.g., glass, polycarbonate lens element).

With an image focused, the image sensor array 152 may be utilized for capture a frame of image data representing an object in the field of view of imaging assembly 150.

Referring to further aspects of second imaging assembly 250, an imaging lens assembly 258 can be adapted for focusing an image onto image sensor array 252. Lens assembly 258 and image sensor array 252 define a field of view of imaging assembly 250, as well as second imaging axis 260. Imaging light rays can be transmitted about second imaging axis 260. Imaging lens assembly 258 can be adapted to be capable of multiple focal lengths and multiple best focus distances. Imaging lens assembly 258 may include a focusing apparatus (e.g., a lens element, a fluid lens element or a pump in combination with a lens element, etc.) employed alone or in combination with other optical elements (e.g., a deformable fluid lens element, an electrowetting fluid lens element, or a traditional non-deformable solid (e.g., glass, polycarbonate lens element). In some embodiments, image sensor array 252 can be provided by an infrared image sensor array that is selectively sensitive to light in the infrared wavelength band. In some embodiments, imaging assembly 150 can be optimized for use in capture of frames visual display and imaging assembly 250 can be optimized for use in capture of frames for subjecting to decoding for determining a decoded message encoded in a decodable indicia. For example, image sensor array 252 can be a color image sensor array having a color filter, e.g., a Bayer pattern and can be devoid of monochrome pixels and image sensor array 152 can include monochrome pixels devoid of color filters. For subjecting to decoding a frame of image data captured utilizing a color image sensor array, image data of one color set, e.g., red, green, or blue, can be subject to processing for decoding with missing pixels positions of the color set being populated with interpolated pixel values.

In some embodiments, the first imaging assembly 150 and/or second imaging assembly 250 may be utilized for capture of a frame of image data representing a barcode. For attempting to decode a bar code symbol, e.g., a one dimensional bar code symbol, a CPU of mobile terminal 10 (e.g., CPU 38 of mobile terminal 10) can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. In some embodiments, mobile terminal 10 can be operative to capture a frame of image data and process the frame for attempting to decode the frame in response to an input, such as an actuation of a trigger. In some embodiments, the server 500 may decode a barcode instead of mobile terminal 10 e.g., responsively to terminal 10 transmitting a frame of image data representing a barcode to server 500.

In some embodiments, server 500 can have the components of terminal 10, including CPU 38 and memory 40. In some embodiments, server 500 can be devoid of imaging assemblies 150, 250. In some embodiments, server 500 can be a peer device of terminal 10, and can have all or essentially all of the elements of terminal 10. FIG. 5 is labeled onto the reference numeral 500 as well as numeral 10 to indicate that the components of terminal 10 can be included in server 500.

Figure 6:
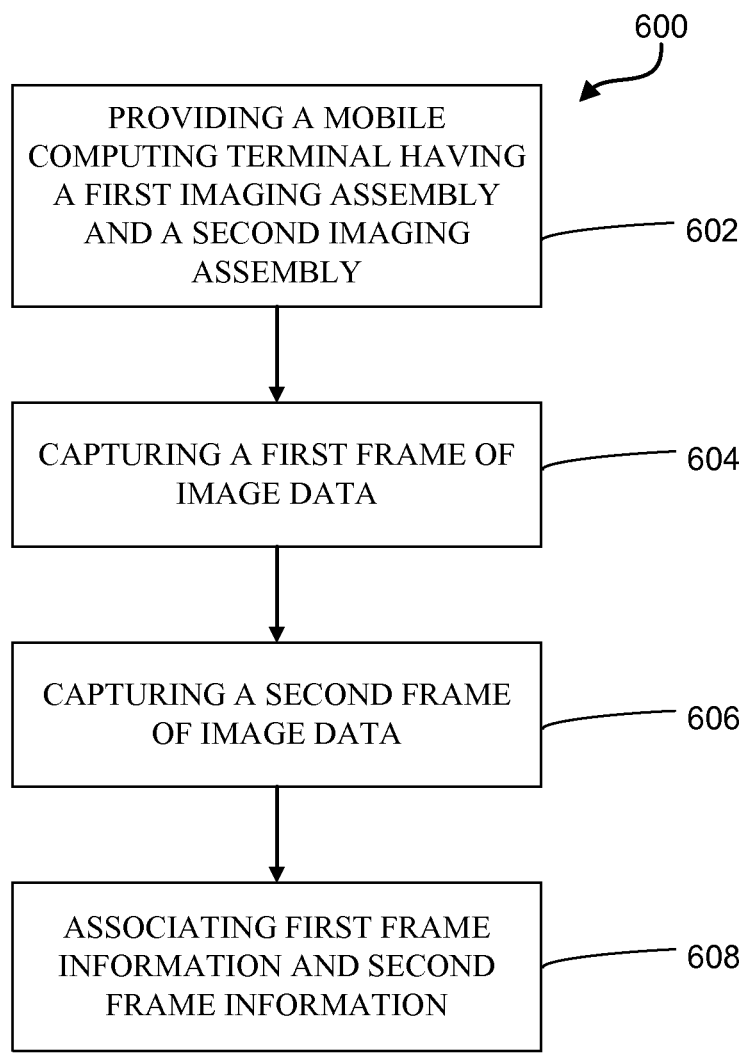
FIG. 6 a method of operation in accordance according to some embodiments of the present invention.

FIG. 6 illustrates a method of operation 600 in accordance with some embodiments. At block 602 a mobile terminal 10 is provided that includes a first imaging assembly 150 and a second imaging assembly 250.

At block 604, the first imaging assembly 150 can be used to capture a first frame of image data representing a first object. At block 606 the second imaging assembly 250 can be used to capture a second frame of image data representing a second object. In some embodiments, blocks 604 and 606 occur contemporaneously such that the first frame of image data representing a first object and the second frame of image data representing a second object are contemporaneously captured.

Figure 7:
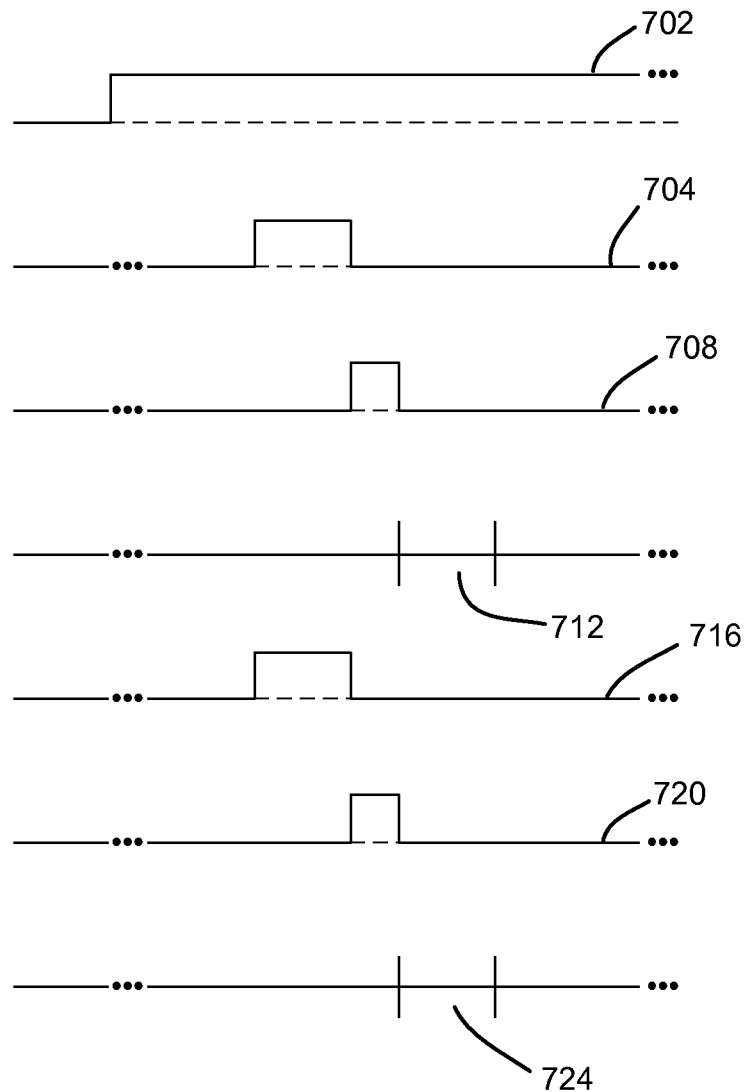
FIG. 7 is a timing diagram illustrating operation of a data collection system in some embodiments.

In one example of a contemporaneous capture a first frame and a second frame can be captured responsively to a common trigger event, as may be initiated by an actuation of a trigger 49. As shown in FIG. 5, terminal 10 can have a trigger 49 for use in activating a trigger signal. Terminal 10 can be configured so that an operator can activate a trigger signal by actuating a trigger, e.g., trigger 49. Trigger 49 can be provided by a physical button (not shown) disposed on housing 300 or can be a virtual trigger that is displayed on display 52. A timing diagram illustrating operation of terminal 10 in some embodiments is shown in FIG. 7. Trigger signal 702 can be made active by manually actuating trigger 49 which can be e.g., a physical trigger or a virtual trigger displayed on display 52. Responsively to the trigger actuating, which can make active trigger signal 702, first image sensor array 152 can be exposed at the logic high period of signal 704, and subject to readout at the logic high period of signal 708, and during processing period 712 CPU 38 can be processing a first frame captured having an exposure being the logic high period of signal 704 and a readout period being the logic high period of signal 708.

Also responsively to actuation of trigger 49, second image sensor array 252 can be exposed during a logic high period of exposure control signal 716 for controlling exposure periods of second image sensor array 252. The second frame exposed during logic high period of signal 716 can be read out during a logic high period of signal 720, and a second frame captured by readout, conversion and storage into memory 40 can be processed by CPU 38 at processing period 724.

It is seen with reference to the timing diagram of FIG. 7, that exposure, read out and processing periods of the first frame captured with use of imaging assembly 150 and a contemporaneously captured second frame captured with use of imaging assembly 250 can be simultaneous. However, such periods can be contemporaneous without being simultaneous, i.e., sequential in time or concurrent, e.g., by way of CPU 38 executing steps associated with processing period 712 and processing period 724 on a time sharing basis. Also, the first frame captured utilizing first imaging assembly 150 processed during processing period 712 and the second frame captured utilizing second imaging assembly 250 processed during processing period 724 can each respectively be one frame of a succession of frames that is captured utilizing its associated imaging assembly responsively to a trigger signal activation.

While terminal 10 can be operative in a mode of operation in which a first frame and a second frame are captured responsively to an actuation of a trigger, and system 800 can be configured so that such a mode is operator selectable and is made available with other operator selectable modes of operation which when active such functionality is not present. There is set forth herein a system 800 operative in a first user selectable mode of operation and a second user selectable mode of operation, wherein the system is operative so that with the first user selectable mode of operation active, the mobile terminal 10 responsively to an activation of a trigger signal captures a frame of image data utilizing the first imaging assembly without a frame of image data being captured utilizing the second imaging assembly, wherein the system is further operative so that with the second user selectable mode of operation active, the mobile terminal responsively to an activation of a trigger signal captures a first frame of image data utilizing the first imaging assembly and a second frame of image data is captured utilizing the second imaging assembly, wherein the system is further operative for associating first frame information and second frame information, the first frame information including one or more of image data of the first frame of image data and information derived utilizing the image data of the first frame of image data, the second frame information including one or more of image data of the second frame of image data and information derived utilizing the image data of the second frame of image data. For enabling selection of the first and second modes, mode selection virtual buttons can be displayed on display 52. For enabling actuation of a trigger signal, one or more virtual triggers can be displayed on display 52. Terminal 10 can be operative so that first and second triggers are provided, so that actuation of the first trigger activates the first mode and activates a trigger signal. Terminal 10 can be further operative so that actuation of the second trigger activates the second mode and activates a trigger signal.

At block 608, first frame information and second frame information can be associated by system 800. Like the capture of the first and second frames of image data, the associating by system 800 and in some embodiments processing prior to associating can be responsive to the actuation of trigger 49 for activation of trigger signal 702. In some embodiments, the first frame information can include image data of the first frame of image data. In some embodiments, the first frame information can include information derived utilizing the image data of the first frame of image data. Such information derived utilizing the image data of the first frame can be a decoded message decoded from a barcode symbol representation represented in the first frame. Similarly, in some embodiments, the second frame information can include image data of the second frame of image data. Furthermore, in some embodiments, the second frame information can include information derived utilizing the image data of the second frame of image data. Such information derived utilizing image data of the second frame can be a decoded message decoded from a barcode symbol represented with second frame. It will be understood that prior to associating frame information corresponding to a frame, the frame can be subject to processing e.g., for decoding of a barcode symbol to determine a decoded message, formatting of the frame into an image file format, or parsing image data for providing a processed frame.

As set forth herein, the system 800 for collecting data can operate to associate the first frame information and second frame information. The association can be performed by a CPU 38 of mobile terminal 10 or a CPU 38 of server 500, or the associating can comprise steps distributed for performance between the mobile terminal 10 and the server 500. In some embodiments, associating comprises providing a file that includes the first frame information and the second frame information. In some embodiments, associating comprises providing a file that includes a reference to the first frame information and a reference to the second frame information. In some embodiments, associating comprises providing a file that includes the first frame information and a reference to the second frame information. In some embodiments, a file for use in associating can be in a markup language file format, Extensible Markup Language (XML) format that includes a reference to one or more of the first frame information and the second frame information.

In some embodiments, system 800 can associate frame information of a plurality of frames of image data wherein frame information of each frame includes image data. For associating image data of a plurality of frames, the plurality of frames of image data can be associated, e.g., by referencing of the frames in a common file after formatting of the frames in an image file format, e.g., TIF, PDF, BMP, without modification of image data of each of the frames. In another embodiment, image data of a plurality of frames captured utilizing different imaging assemblies can be associated by providing a processed frame having first image data pixel position coordinates comprising image data captured utilizing a certain one of the imaging assemblies and second pixel position coordinates comprising image data captured utilizing the other one of the imaging assemblies.

System 800 can be operative to associate frame information of a plurality of frames captured utilizing different imaging assemblies by associating image data of one of the frames with decoded barcode message data determined by processing the other one of the frames. Associating decoded message data with image data can comprise, e.g., including the decoded message data in an open data field location of an image file including the image data or e.g., providing a file, e.g., text based, e.g., XML file having a reference to an image file and including the decoded message. Image file formats, e.g., TIF, PDF, BMP, can have image data field locations for inclusion of image data, and open data field locations in which variable data can be included. Frame information can be included in such open field locations for association of frame information of first and second frames.

In another example of associating, associating performed by system 800 at block 608 can include commonly displaying first frame information and second frame information on a common display e.g., display 52 of terminal 10 and/or display 52 of server 500. Commonly displaying can comprise sequentially displaying or simultaneous displaying of frame information. Where associated frame information of first and second frames includes image data, commonly displaying on a display 52 (e.g. of mobile terminal 10 or server 500) image data of a first frame and image data of a second frame can comprise display of a single image file, e.g., in the case a processed frame is provided having image data of first and second frame, a plurality of image files, or zero image files, e.g., in the case raw image data is displayed without prior formatting into an image file format.

In another aspect of method 600, which can be performed in combination with any example set forth herein, frames captured at block 604 and block 606 can further be time stamped utilizing real time clock (RTC) 47. A time stamp associated to a captured frame can be associated to data derived utilizing the captured frame. System 800 can utilize time stamping for associating frame information. In one example, system 800 can perform associating at block 608 by identifying frame information having a common time stamp. Such associating by identifying common time stamps can be performed e.g., by CPU 38 of terminal 10 or CPU 38 of server 500.

Figure 8:
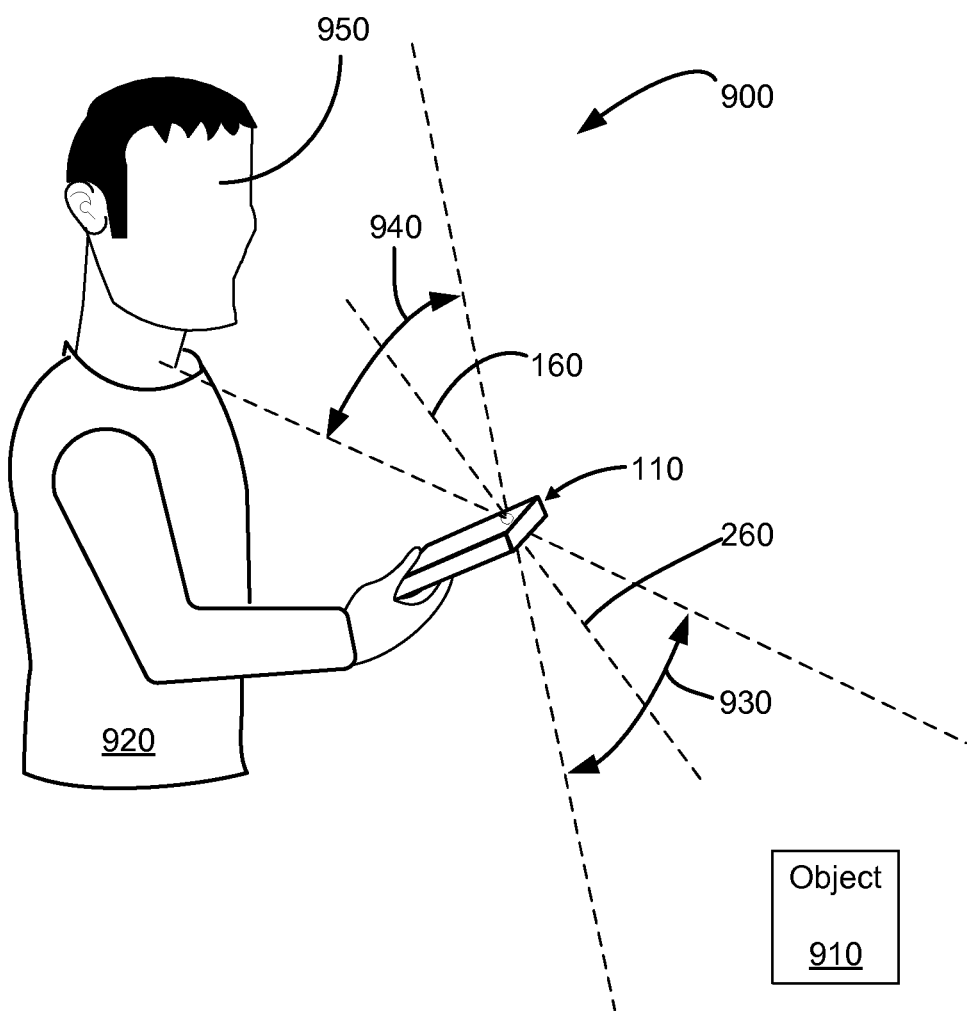
FIG. 8 is a schematic diagram illustrating a use application of the system set further herein.

FIG. 8 illustrates a diagram 900 of an operator and mobile terminal 10 according to some embodiments set forth herein. In FIG. 8, an operator 920 is utilizing a mobile terminal 10. The first imaging axis 160 and a field of view 940 centered around first imaging axis 160 extend outwardly and away from the mobile terminal 10. The face 950 of the operator is within the field of view 940 and along the first imaging axis 160. Accordingly, since the face 950 of the operator 920 is within the field of view 940, the operator 920 may use the first imaging assembly 150 (see FIG. 5) of mobile terminal 10 to capture a frame of image data representing face 950.

FIG. 8 further illustrates the second imaging axis 260 and a field of view 930 centered around second imaging axis 260 that extends outwardly and away from the mobile terminal 10. An object 910 is within the field of view 930 and along second imaging axis 260. Accordingly, since the object 910 is within the field of view 930, the operator 920 may use the second imaging assembly 250 (see FIG. 5) of mobile terminal 10 to capture a frame of image data representing an object. Thus, an operator 920 may utilize terminal 10 to capture a frame of image data representing their face 950 and a frame of image data representing an object 910.

In some embodiments, the first frame of image data includes a representation of a first object and the second frame of image data includes a representation of a second object. These objects may be simultaneously present in a target environment. In some embodiments the association between frame information corresponding to the two objects may serve as a verification that the two objects were simultaneously present. In some embodiments, a contemporaneous capturing of frames of image data representing the first object and second object occurs.

In some embodiments, the first frame of image data includes a representation of a health care provider (e.g., doctor) and the second frame of image data a patient. Accordingly, by using the above described methods, structures and apparatus, an association can be created between frame information corresponding to a health care provider and frame information corresponding to the patient. The association created between frame information corresponding to the health care provider and frame information corresponding to the patient may serve as a record or log to determine whether a health care provider met with a patient.

In some embodiments, terminal 10 can be operated and system 800 can be configured so that the first frame of image data represents a provider of medicine and the second frame of image data represents an article (e.g., container) comprising medicine. The article can be labeled with a barcode. The second frame of image data can be subject to decoding to determine a decoded message. The decoded message may indicate characteristics of the medicine (e.g., type, quantity, dosage, strength, etc.) For associating first frame information with second frame information, system 800 can associate image data of the first frame (representing a medicine provider) with a decoded message decoded by processing the second frame. Accordingly, by using the above described methods, structures and apparatus, an association can be created between the provider of medicine, a person who received the medicine and the medicine.

In some embodiments, terminal 10 can be operated so that the first frame of image data represents an object to be delivered to a location, and the second frame of image data represents the location. An association between the image data representing the object to be delivered to a location, and image data representing a scene indicating the location can serve as verification that the object was delivered. For instance, a delivery person could utilize terminal 10 to capture frames of image data representing the object and location as proof of delivery. Accordingly, by using the above described methods, structures and apparatus, an association can be created between the object to be delivered to a location and the location.

In some embodiments, terminal 10 can be operated so that the first frame of image data represents a security officer and the second frame of image data represents a barcode that encodes a message that identifies a location the security officer is assigned to patrol. In such embodiments, system 800 can be operative to process the second frame to determine the decoded message, and can further be operative to associate image data of the first frame and the decoded message so that the first frame information comprises image data of the first frame and the second frame information comprises the decoded message. The association between the first frame information comprising image data representing the security officer and the second frame information comprising a decoded message identifying a location the security officer is assigned to patrol can serve as verification that the security officer patrolled their assigned route.

In some embodiments, terminal 10 can be operated so that the first frame of image data includes a representation of an operator and the second frame of image data includes a representation of a generic scene. Further, system 800 can be operative so that the first frame information includes image data of the first frame and the second frame information includes image data of the second frame. The associating can include associating image data of the first frame with image data of the second frame. In one example, the first and second frames can be associated without modification of image data of either frame. In another example for associating image data of the first frame with image data of the second frame a frame of image data can be provided including combined image data of the first frame and the second frame, e.g., image data of the first frame representing an operator presented in a reserved coordinate space of the second frame so that the representation of the generic scene includes a representation of the operator. The associating can also or alternatively include simultaneous display of image data of the first frame and the second frame. In such embodiment, system 800 can be operative to provide a record of location of an operator. In one variation of the described embodiment, the operator is a specific operator type and the scene provides a record of the location of the operator. For example the operator can be a security officer. Where the operator is security officer in the described embodiment, system 800 can be operative to provide a record of a location of a security officer.

Figure 9:
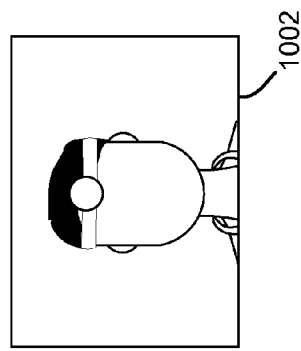
FIG. 9 is a set of diagrams illustrating an associating of frame information in one embodiment.
Figure 9:
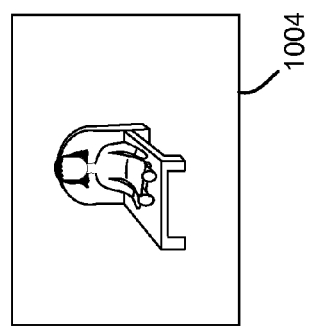
Figure 9:
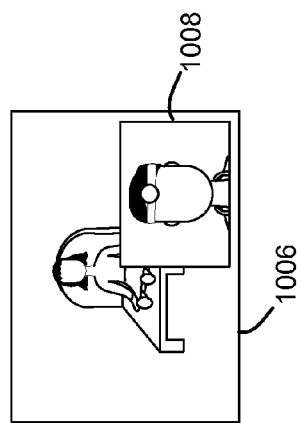

In some embodiments, terminal 10 can be operated so that the first frame of image data includes a representation of an operator where the operator is health care provider and the second frame of image data includes a representation of patient. Further, system 800 can be operative so that the first frame information includes image data of the first frame and the second frame information includes image data of the second frame. The associating can include associating image data of the first frame with image data of the second frame. In one example, the first and second frames can be associated without modification of image data of either frame. In another example, for associating image data of the first frame with image data of the second frame a frame of image data can be provided including combined image data of the first frame and the second frame, e.g., image data of the first frame representing an operator presented in a reserved coordinate space of the second frame so that the representation of a scene including a representation of a patient includes a representation of the health care provider. For example, a first frame 1002 including a representation of a health care provider and a second frame 1004 having a representation of a patient can be as depicted in FIG. 9. A processed frame 1006 associating image data of the first frame and the second frame can be provided as depicted in FIG. 9. Processed frame 1006 can be provided by including in reserved pixel position coordinate space 1008 indicated by border 1008, an image data representation of an object represented in the first frame, e.g., the health care provider represented in the first frame 1002. Processed frame 1006 can be formatted in an image file format, e.g., TIF, PDF, BMP. In the formatted image file in which frame 1006 is formatted, a portion of the image data fields of the image file can include image data of the first frame representing an object represented in the first frame, and a portion of the image file can include image data representing an object represented in the second frame. In the specific example of FIG. 9, image data of the first frame 1002 shown as being associated to second frame image data by being included in processed frame 1006, can be reduced in scale relative to a scale of first frame 1002, and accordingly can have a lower resolution than resolution of first frame 1002. The associating can also or alternatively include simultaneous display of image data of the first frame and the second frame, i.e., image data representing the health care provider and image data representing a patient. In such embodiment, system 800 can be operative to provide a record of a patient associated with health care provider providing care to the patient.

In some embodiments, terminal 10 can be operated so that the first frame of image data includes a representation of an operator where the operator is health care provider (e.g., doctor, nurse, pharmacist) and the second frame of image data includes a representation of an article comprising medicine. The article can be e.g., a container such as a bottle or an intravenous bag. Further, system 800 can be operative so that the first frame information includes image data of the first frame and the second frame information includes image data of the second frame. The associating can include associating image data of the first frame with image data of the second frame. In one example, the first and second frames can be associated without modification of image data of either frame. In another example, for associating image data of the first frame with image data of the second frame a frame of image data can be provided including combined image data of the first frame and the second frame, e.g., image data of the second frame representing an article comprising medicine presented in a reserved coordinate space of the first frame so that the representation of a scene including a representation of a health care provider includes a representation of an article comprising medicine administered by the health care provider. The associating can also or alternatively include simultaneous display of image data of the first frame and the second frame, i.e., image data representing the health care provider and image data representing a medicine containing article administered by the health care provider. In such embodiment, system 800 can be operative to provide a record of an article of medicine associated with health care provider administering the medicine.

In some embodiments, terminal 10 can be operated so that the first frame of image data includes a representation of an operator where the operator is a health care provider (e.g., doctor, nurse, pharmacist) and the second frame of image data includes a representation of an article comprising medicine. The article can be e.g., a container such as a bottle or an intravenous bag and the article can further comprise a barcode encoding a decoded message indicating an identifier for the medicine. Further, system 800 can be operative so that the first frame information includes image data of the first frame and the second frame information includes a decoded message determined by decoding the bar code via processing of the second frame of image data. The associating can include associating image data of the first frame with the decoded message. For associating a decoded message to a frame of image data, the decoded message can be included in an open data field location of a formatted file into which the frame of image data is formatted after initial capture. For associating a decoded message to a frame of image data, the decoded message and the frame of image data can otherwise be provided in a common file. For associating a decoded message to a frame of image data, a file can be provided that includes a reference to the decoded message and the frame of image data. The associating can also or alternatively include simultaneous display of image data of the first frame and the decoded message, i.e., image data representing the health care provider and decoded message data including information respecting the medicine administered by the health care provider. In such embodiment, system 800 can be operative to provide a record of an article of medicine associated with health care provider administering the medicine.

In some embodiments, terminal 10 can be operated so that the first frame of image data includes a representation of an operator where the operator is a delivery personnel and the second frame of image data includes a representation of an article being delivered, e.g., a parcel. Further, system 800 can be operative so that the first frame information includes image data of the first frame and the second frame information includes image data of the second frame. The associating can include associating image data of the first frame with image data of the second frame. In one example, the first and second frames can be associated without modification of image data of either frame. In another example, for associating an image data of the first frame with image data of the second frame a frame of image data can be provided including combined image data of the first frame and the second frame, e.g., image data of the first frame representing a delivery personnel presented in a reserved pixel position coordinate space of the second frame so that the representation of a scene including a representation of an article being delivered includes a representation of a delivery personnel. The associating can also or alternatively include simultaneous display of image data of the first frame and the second frame, i.e., image data representing the delivery personnel and image data representing an article being delivered. In such embodiment, system 800 can be operative to provide a record of an article being delivered associated with delivery personnel delivering the article.

In the example of FIG. 9 and in other examples herein, it was set forth that a processed frame, e.g., processed frame 1006 as shown in FIG. 9 provided for associating image data of a first frame and a second frame can include image of the first frame (re-scaled in the particular example of FIG. 9) and image data of the second frame. In the example of FIG. 9, reserved pixel position coordinates 1008 of a second frame 1004 were designated for inclusion of image data of first frame 1002 for the providing of processed frame 1006.

Figure 10:
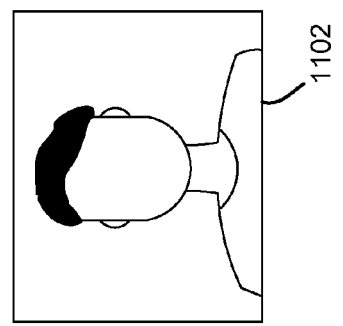
FIG. 10 is a set of diagrams illustrating an associating of frame information in one embodiment.
Figure 10:
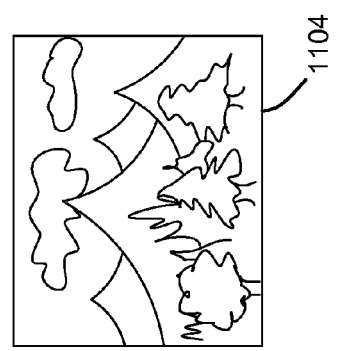
Figure 10:
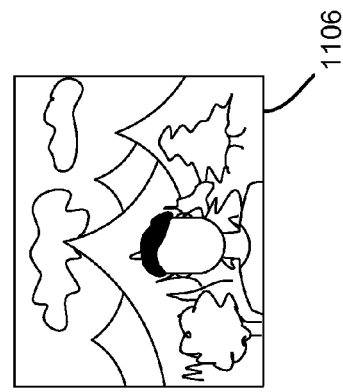

In some embodiments, pixel position coordinates for inclusion of any of the frames into another of the frames can be variably determined. In the example of FIG. 10, first frame 1102 captured utilizing imaging assembly 150 includes a representation of an operator and second frame 1104 includes a representation of a generic scene, in the example shown, a mountain range. As indicated in FIG. 10, second frame 1104 can be devoid of a representation of an operator. A processed frame 1106 provided for associating image data of the first frame 1102 and second frame 1104 is depicted in FIG. 10. Prior to associating image data of the first frame 1102, the image data can be cropped and optionally scaled. The depicted cropping includes removal of image data of first frame 1102 that does not correspond to the operator. Removed image data can be, e.g., erased or suppressed (e.g., included in an open field location of an image file for later recovery). Processing for cropping of image data can include execution of a boundary recognition algorithm for searching for boundaries between image data representing the operator and image data not representing the operator. Various boundary recognition can be utilized, including various search based and/or zero-crossing based boundary recognition algorithms. In one example, a Canny edge detection algorithm can be utilized. In another example, a differential edge detection algorithm can be utilized. The resulting processed frame 1106 depicts an operator in the scene corresponding to a field of view of second imaging assembly 250. Processed frame 1106 can be formatted in an image file format e.g., TIF, PDF, BMP. The processing depicted in FIG. 10 addresses the age old problem of "needing someone else to take a picture." By the processing depicted in FIG. 10, an operator can utilize terminal 10 to output a picture of himself in a scene corresponding a field of view of second imaging assembly 250 without use of a timed trigger while holding terminal 10 in such a manner as to optimize a field of view of imaging assembly 250 with a scene of interest. System 800 can be operative so that responsively to actuation of a trigger, e.g., trigger 49, terminal 10 can capture a first frame and a second frame and further responsively to the actuation of the trigger e.g., trigger 49, first frame information and second frame information can be associated. Further responsively to an actuation of a trigger, e.g., trigger 49, system 800 can display associated image data of a first frame and second frame on a display, e.g., display, e.g., display 52 and/or display 52 of server. Such display can comprise display of processed frame 1106.

In some embodiments, terminal 10 can be operated so that the first frame of image data includes a representation of an operator where the operator is a delivery personnel and the second frame of image data includes a representation of an article being delivered. The article can be e.g., a parcel and can further comprise a barcode encoding a decoded message indicating an identifier for the medicine. Further, system 800 can be operative so that the first frame information includes image data of the first frame and the second frame information includes a decoded message determined by decoding the bar code via processing of the second frame of image data. The associating can include associating image data of the first frame with the decoded message. For associating a decoded message to a frame of image data, the decoded message can be included in an open data field of a formatted image file into which the frame of image data is formatted after initial capture. For associating a decoded message to a frame of image data, the decoded message and the frame of image data can otherwise be provided in a common file. For associating a decoded message to a frame of image data, a file can be provided that includes a reference to the decoded message and the frame of image data. The associating can also or alternatively include simultaneous display of image data of the first frame and the decoded message, i.e., image data representing the delivery personnel and decoded message data including information respecting the article delivered by the delivery personnel. In such embodiment, system 800 can be operative to provide a record of an article being delivered associated with delivery personnel delivering the article.

In any of the embodiments described, wherein the first frame information includes image data representing an operator of terminal 10, the first frame information can in addition or instead be provided by a biometric identifier determined by decoding the image data representing the operator. In some embodiments, server 500 can include a biometric database including feature data for a plurality of candidate operators. Terminal 10 can transmit a first frame of image data to server 500 for processing the frame of image data for determining the biometric identifier.

While still frames are described in the forgoing examples the associating of frame information set forth herein can be performed utilizing moving frames, i.e., successions of frames. In one example, server 500 and terminal 10 can be equipped with a display 52 and one or more imaging assembly 150, 250 and each of server 500 and terminal 10 can be configured in accordance with suitable video conferencing software to support line bi-directional video streaming between terminal 10 and server 500. In such embodiments, system 800 can be configured so that a succession of frames transmitted from terminal 10 to server 500 are processed frames formatted to include a portion of image data captured utilizing imaging assembly 150 and a portion of image data utilizing assembly 250. The succession of processed frames can be processed in accordance with a format, e.g., as depicted by frame 1006 having reserved pixel position coordinates 1008 for including image data captured utilizing a certain one imaging assembly of a set of imaging assemblies 150, 250, and remaining pixel position coordinates for inclusion of image data captured utilizing a remaining imaging assembly 150, 250, or as depicted in processed frame 1106 (FIG. 10) with coordinate pixel positions for inclusion of image data captures using a certain one of the imaging assemblies 150, 250 being variably determined, and the remaining pixel coordinates including image data captured utilizing the remaining imaging assembly 150, 250. In such manner, streaming video comprising frames representing an operator in a current environment of the operator can be transmitted.

A small sample of systems methods and apparatus that are described herein is as follows:

A1. A system for collecting data comprising:

a mobile terminal for capturing a plurality of frames of image data, the mobile terminal having a first imaging assembly, a second imaging assembly, a display, and a hand held housing on which the display is disposed and which houses one or more component of the first imaging assembly and one or more component of the second imaging assembly, wherein the first imaging assembly comprises a first image sensor array and a first imaging lens focusing an image onto the first image sensor array of the first imaging assembly, the first image sensor array having a plurality of pixels arranged in a plurality of rows and columns of pixels, the first imaging assembly for use in capturing a first frame of image data representing a first object, wherein the second imaging assembly comprises a second image sensor array and a second imaging lens focusing an image onto the second image sensor array of the second imaging assembly, the second image sensor array having a plurality of pixels arranged in a plurality of rows and columns of pixels, the second imaging assembly for use in capturing a second frame of image data representing a second object; and wherein the system is operative for associating first frame information and second frame information, the first frame information including one or more of image data of the first frame of image data and information derived utilizing image data of the first frame of image data, the second frame information including one or more of image data of the second frame of image data and information derived utilizing image data of the second frame of image data.

A2. The system of A1, wherein the display extends in a display plane, the first imaging assembly includes a first imaging axis extending upwardly from the display plane and the second imaging assembly includes a second imaging axis extending downwardly from the display plane.

A3. The system of A1, wherein the display extends in a display plane, the first imaging axis extends upwardly from the display plane, and the second imaging axis extends forwardly from the mobile terminal.

A4. The system of A1, further wherein the first imaging assembly includes a first imaging axis and the second imaging assembly includes a second imaging axis, wherein the first imaging axis and second imaging axis are parallel and spaced apart from each other.

A5. The system of A1, further wherein the first imaging assembly includes a first imaging axis and the second imaging assembly includes a second imaging axis, wherein the first imaging axis and the second imaging axis extend in directions non-parallel relative to one another.

A6. The system of A1, wherein the first frame and the second frame are contemporaneously captured.

A7. The system of A1, wherein the mobile terminal includes a trigger, and wherein the system is operative so that responsively to an actuation of the trigger the mobile terminal captures the first frame of image data and the second frame of image data.

A8. The system of A1, wherein the mobile terminal includes a trigger, and wherein the system is operative so that responsively to an actuation of the trigger the mobile terminal captures the first frame of image data and the second frame of image data.

A9. The system of A1, wherein the associating comprises providing a file that includes the first frame information and the second frame information.

A10. The system of A1, wherein the associating comprises providing a file that includes a reference to the first frame information and a reference to the second frame information.

A11. The system of A1, wherein the associating comprises providing a file that includes the first frame information and a reference to the second frame information.

A12. The system A1, further wherein one or more of the first image sensor assembly and the second image sensor assembly is an infrared imager.

A13. The system A1, wherein the associating comprises providing an Extensible Markup Language file that includes a reference to one or more of the first frame information and the second frame information.

A14. The system of claim A1, wherein the associating includes providing a processed frame, the processed frame having image data of the first frame and image data of the second frame.

A15. The system of claim A1, wherein the associating includes providing a processed frame, the processed frame having image data of the first frame and image data of the second frame, wherein the image data of the first frame, included in the processed frame is cropped utilizing a border recognition algorithm for removal of image data of the first frame, and wherein the processed frame is formatted in an image file format including first image data fields having image data of the first frame and second image data fields having image data of the second frame.

A16. The system of claim A1, wherein the associating includes providing a processed frame, the processed frame having image data of the first frame and image data of the second frame, wherein the processed frame is included in a succession of processed frames transmitted by the mobile terminal, the succession of processed frames having image data of the first frame and image data of the second frame.

B1. A method for use in collecting data, comprising:
providing a mobile terminal for capturing a plurality of frames of image data, the mobile terminal having a first imaging assembly, a second imaging assembly, a display, and a hand held housing on which the display is disposed and which houses a component of the first imaging assembly and the second imaging assembly, wherein the first imaging assembly comprises a first image sensor array and a first imaging lens focusing an image onto the first image sensor array of the first imaging assembly, the first image sensor array having a plurality of pixels arranged in a plurality of rows and columns of pixels, wherein the second imaging assembly comprises a second image sensor array and a second imaging lens focusing an image onto the second image sensor array of the second imaging assembly, the second image sensor array having a plurality of pixels arranged in a plurality of rows and columns of pixels;
capturing a first frame of image data using the first imaging assembly, the first frame of image data including a representation of a first object;
capturing a second frame of image data representing a second image using the second imaging assembly, the second frame of image data including a representation of a second object; and
associating first frame information and second frame information, the first frame information including one or more of image data of the first frame of image data and information derived utilizing image data of the first frame of image data, the second frame information including one or more of image data of the second frame of image data and information derived utilizing image data of the second frame of image data.

B2. The method of B1, wherein the capturing the first frame of image data includes capturing the first frame of image data so that the first frame represents of a first object and wherein the capturing the second frame of image data includes capturing the second frame of image data so that the second frame represents a second object, and the first object and the second object are simultaneously present in a target environment.

B3. The method of B1, wherein the capturing of the first frame of image data and the capturing of the second frame of image data are provided so that the first frame represents a health care provider and the second frame represents a patient.

B4. The method of B1, wherein the capturing of the second frame of image data is provided so that the second frame of image data includes a representation of a barcode, and the method further includes the step of decoding the barcode representation to determine a decoded message, and further wherein the first frame information includes the decoded message.

B5. The method of B1, wherein the capturing of the first frame of image data and the capturing of the second frame of image data are provided so that the first frame of image data includes a representation of an object to be delivered to a location, and the second frame of image data represents the location.

B6. The method of B1, wherein the capturing of the first frame of image data and the capturing of the second frame of image data are provided so that the first frame of image data represents a security officer and the second frame of image data includes a representation of a barcode that identifies a location of the security officer.

B7. The method of B1, wherein the capturing of the first frame of image data and the capturing of the second frame of image data are provided so that the first frame of image data includes a representation of an operator, and the second frame of image data represents a scene to which the operator is proximate.

B8. The method of B1, wherein the first frame information comprises a biometric identifier determined by processing the first frame of image data.

B9. The method of B1, wherein the associating comprises simultaneously displaying the first frame information and the second frame information.

B10. The method of B1, wherein the method is performed so that a representation of the second object is not included in the first frame of image data.

B11. The method of B1, wherein the method includes providing the mobile terminal so that the capturing the first frame and the capturing the second frame and the associating are responsive to a trigger signal activation by an operator, and wherein the method further includes, responsively to an activation of a trigger signal by an operator, capturing the first frame of image data and the second frame of image data so that the first frame of image data includes a representation of the operator, and the second frame of image data includes a representation a scene proximate the operator without including a representation of the operator and further responsively to the activation of the trigger signal, associating the first frame information and the second frame information by providing a processed frame including image data of the first frame and image data of the second frame, the image data of the first frame being cropped image data that is cropped for removal of image data not representing the operator.

C1. A system for collecting data comprising:

a mobile terminal for capturing a plurality of frames of image data, the mobile terminal having a first imaging assembly, a second imaging assembly, a display, and a hand held housing on which the display is disposed and which houses a component of the first imaging assembly and the second imaging assembly, wherein the first imaging assembly comprises a first image sensor array and a first imaging lens focusing an image onto the first image sensor array of the first imaging assembly, the first image sensor array having a plurality of pixels arranged in a plurality of rows and columns of pixels, wherein the second imaging assembly comprises a second image sensor array and a second imaging lens focusing an image onto the second image sensor array of the second imaging assembly, the second image sensor array having a plurality of pixels arranged in a plurality of rows and columns of pixels;

wherein the system is operative in a first user selectable mode of operation and a second user selectable mode of operation;

wherein the system is operative so that with the first user selectable mode of operation active, the mobile terminal is operative so that responsively to an activation of a trigger signal by the operator, a frame of image data is captured utilizing the first imaging assembly without a frame of image data being captured utilizing the second imaging assembly;

wherein the system is operative so that with the second user selectable mode of operation active, the mobile terminal is operative so that responsively to an activation of a trigger signal by the operator, a first frame of image data is captured utilizing the first imaging assembly and a second frame of image data is captured utilizing the second imaging assembly;

wherein the system is operative for associating first frame information and second frame information, the first frame information including one or more of image data of the first frame of image data and information derived utilizing the image data of the first frame of image data, the second frame information including one or more of image data of the second frame of image data and information derived utilizing the image data of the second frame of image data.

C2. The system of C1, wherein the system is operative so that further responsively to the trigger signal being activated with the second mode of operation active, the associating is performed.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A method, comprising:

capturing a first plurality of frames of image data comprising a first frame of image data, the first plurality of frames of image data representing a scene in a field of view of a first imaging assembly of a terminal;

capturing a second plurality of frames of image data comprising a second frame of image data, the second plurality of frames of image data representing a scene in a field of view of a second imaging assembly of the terminal;

associating first frame information and second frame information, the first frame information including one or more of image data of the first frame of image data and information derived utilizing image data of the first frame of image data, the second frame information including one or more of image data of the second frame of image data and information derived utilizing image data of the second frame of image data; and storing in the terminal video formatted to include image data of the first plurality of frames of image data and image data of the second plurality of frames of image data;

wherein frame images of the video are formatted to include reserved pixel coordinates for image data of the first plurality of frames of image data and remaining pixel coordinates for image data of the second plurality of frames of image data, the frame images having been cropped utilizing a border recognition algorithm for removal of image data of the first plurality of frames of image data and/or the second plurality of frames of image data.

2. The method of claim 1, wherein frame images of the video are formatted in an image file format including first image data fields having image data of the first plurality of frames of image data and second image data fields having image data of the second plurality of frame of image data.

3. The method of claim 1, wherein:

frame images of the video are formatted to include first pixel coordinates for image data of the first plurality of frames of image data and second pixel coordinates for image data of the second plurality of frames of image data; and the first pixel coordinates and the second pixel coordinates are variably determined between images of the frame images.

4. The method of claim 1, wherein:

frame images of the video are formatted to include first pixel coordinates for image data of the first plurality of frames of image data and second pixel coordinates for image data of the second plurality of frames of image data; and the first pixel coordinates and the second pixel coordinates are variably determined between images of the frame images based on a representation of an object between frames of the first plurality of frames of image data.

5. A method, comprising:

capturing a first plurality of frames of image data comprising a first frame of image data, the first plurality of frames of image data representing a scene in a field of view of a first imaging assembly having a first imaging axis;

capturing a second plurality of frames of image data comprising a second frame of image data, the second plurality of frames of image data representing a scene in a field of view of a second imaging assembly of the terminal having a second imaging axis that is non-parallel to the first imaging axis; and associating first frame information and second frame information, the first frame information including one or more of image data of the first frame of image data and information derived utilizing image data of the first frame of image data, the second frame information including one or more of image data of the second frame of image data and information derived utilizing image data of the second frame of image data;

storing a video comprising frame images formatted to include reserved pixel coordinates for image data of the first plurality of frames of image data and remaining pixel coordinates for image data of the second plurality of frames of image data, the frame images having been cropped utilizing a border recognition algorithm for removal of image data of the first plurality of frames of image data and/or the second plurality of frames of image data.

6. The method of claim 5, wherein the scene in a field of view of the first imaging assembly includes a person and the scene in a field of view of the second imaging assembly includes an article comprising a bar code.

7. The method of claim 5, wherein:
the scene in a field of view of the first imaging assembly includes a person;
the scene in a field of view of the second imaging assembly includes an article comprising a bar code; and
the second frame information includes a decoded message determined by processing the second frame.

8. The method of claim 5, wherein:
the scene in a field of view of the second imaging assembly includes an article comprising a bar code; and
the second frame information includes decoded message determined by processing the second frame.

9. The method of claim 5, wherein:
the first frame of image data includes a representation of a person;
the scene in a field of view of the second imaging assembly includes an article comprising a bar code;
the second frame information includes a decoded message determined by processing the second frame; and
the associating comprises providing a file having both image data of the first frame of image data and the decoded message.

10. The method of claim 5, wherein:
the first frame of image data includes a representation of a person;
the scene in a field of view of the second imaging assembly includes an article comprising a bar code;
the second frame information includes a decoded message determined by processing the second frame; and
the associating comprises providing an image file having both image data of the first frame of image data and an open data field location including the decoded message.

11. The method of claim 5, wherein:
the scene in a field of view of the first imaging assembly includes a health care provider; and
the scene in a field of view of the second imaging assembly includes an article for use in treating a patient.

12. The method of claim 5, wherein:
the scene in a field of view of the first imaging assembly includes a delivery personnel; and
the scene in a field of view of the second imaging assembly includes an article being delivered.

13. The method of claim 5, wherein:
the scene in a field of view of the first imaging assembly includes a delivery personnel;
the scene in a field of view of the second imaging assembly includes an article being delivered having a barcode; and
the second frame information includes a decoded message determined by processing the second frame of image data.

14. The method of claim 5, wherein:
the scene in a field of view of the first imaging assembly includes a person;
the scene in a field of view of the second imaging assembly includes an article;
the first frame information includes a biometric identifier determined by processing the first frame of image data; and
the second frame information includes data determined by processing the second frame of image data.

15. The method of claim 5, comprising transmitting from the terminal streaming video, the streaming video formatted to include image data of the first plurality of frames of image data and image data of the second plurality of frames of image data.

16. The method of claim 15, wherein frame images of the streaming video are formatted to include reserved pixel coordinates for image data of the first plurality of frames of image data and remaining pixel coordinates for image data of the second plurality of frame of image data.

17. The method of claim 15, wherein:
frame images of the streaming video are formatted to include first pixel coordinates for image data of the first plurality of frames of image data and second pixel coordinates for image data of the second plurality of frames of image data; and
the first pixel coordinates and the second pixel coordinates are variably determined between images of the frame images.

18. The method of claim 15, wherein:
frame images of the streaming video are formatted to include first pixel coordinates for image data of the first plurality of frames of image data and second pixel coordinates for image data of the second plurality of frames of image data; and
the first pixel coordinates and the second pixel coordinates are variably determined between images of the frame images based on a representation of an object between frames of the first plurality of frames of image data.

19. A method, comprising:
capturing a first plurality of frames of image data comprising a first frame of image data, the first plurality of frames of image data representing a scene in a field of view of a first imaging assembly having a first imaging axis;
capturing a second plurality of frames of image data comprising a second frame of image data, the second plurality of frames of image data representing a scene in a field of view of a second imaging assembly of the terminal having a second imaging axis that is non-parallel to the first imaging axis;

associating first frame information and second frame information, the first frame information including one or more of image data of the first frame of image data and information derived utilizing image data of the first frame of image data, the second frame information including one or more of image data of the second frame of image data and information derived utilizing image data of the second frame of image data; and storing in the terminal video formatted to include image data of the first plurality of frames of image data and image data of the second plurality of frames of image data;

wherein frame images of the video are formatted to include reserved pixel coordinates for image data of the first plurality of frames of image data and remaining pixel coordinates for image data of the second plurality of frames of image data, the frame images having been cropped utilizing a border recognition algorithm for removal of image data of the first plurality of frames of image data and/or the second plurality of frames of image data.

20. The method of claim 19, wherein frame images of the video are formatted in an image file format including first image data fields having image data of the first plurality of frames of image data and second image data fields having image data of the second plurality of frame of image data.

* * * * *